US012039202B2

(12) United States Patent
Sharma et al.

(10) Patent No.: US 12,039,202 B2
(45) Date of Patent: Jul. 16, 2024

(54) DYNAMIC ORDERING OF MEMORY DIE PROGRAMMING IN A METABLOCK (71) Applicant: Western Digital Technologies, Inc., San Jose, CA (US)

(72) Inventors: Amit Sharma, Bengaluru (IN); Abhinandan Venugopal, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 90 days.

(21) Appl. No.: 17/946,565

(22) Filed: Sep. 16, 2022

(65) Prior Publication Data

US 2024/0094951 A1 Mar. 21, 2024

(51) Int. Cl.
*G06F 3/06* (2006.01)
(52) U.S. Cl.
CPC .......... *G06F 3/0659* (2013.01); *G06F 3/0619* (2013.01); *G06F 3/0679* (2013.01)
(58) Field of Classification Search
CPC ........ G06F 3/06; G06F 3/0619; G06F 3/0679; G06F 3/0659; G06F 3/0683; G06F 3/0688; G06F 3/0653
See application file for complete search history.

(56) References Cited

U.S. PATENT DOCUMENTS

2016/0098216 A1* 4/2016 Huang ................. G06F 11/073 714/37
2016/0202910 A1* 7/2016 Ravimohan ......... G06F 12/0246 711/103
2016/0292092 A1* 10/2016 Gavens ................. G06F 3/0629
2017/0109040 A1* 4/2017 Raghu ..................... G06F 3/061
2018/0239547 A1* 8/2018 Inbar .................... G06F 12/0246
2020/0050400 A1* 2/2020 Kim ....................... G06F 3/0659
2020/0242038 A1* 7/2020 Bazarsky ............ G06F 12/0862

FOREIGN PATENT DOCUMENTS

WO WO-2014105829 A2 * 7/2014 ......... G06F 12/0246
WO WO-2016160075 A1 * 10/2016 .......... G06F 13/161
WO WO-2017123530 A1 * 7/2017 ......... G06F 12/0246

OTHER PUBLICATIONS

R. Jin, J.-Y. Paik, J. Wang, Y. Biadgie, Y. Rao and T.-S. Chung, "Managing Massive Amounts of Small Files in All-Flash Storage," 2020 IEEE 44th Annual Computers, Software, and Applications Conference (COMPSAC), Madrid, Spain, 2020, pp. 386-393.*
G. Kurian, Q. Shi, S. Devadas and O. Khan, "OSPREY: Implementation of Memory Consistency Models for Cache Coherence Protocols involving Invalidation-Free Data Access," 2015 International Conference on Parallel Architecture and Compilation (PACT), San Francisco, CA, USA, 2015, pp. 392-405.*
L. A. J. Marzulo, F. M. G. Franca and V. S. Costa, "Transactional WaveCache: Towards Speculative and Out-of-Order DataFlow Execution of Memory Operations," 2008 20th International Symposium on Computer Architecture and High Performance Computing, Campo Grande, Brazil, 2008, pp. 183-190.*

* cited by examiner

*Primary Examiner* — Pierre Michel Bataille
(74) *Attorney, Agent, or Firm* — Armstrong Teasdale LLP (57) ABSTRACT A programming order of memory dies of a metablock is typically fixed. However, in some storage architectures, this may cause performance bottlenecks. As such, the programming order of the memory dies may be altered to reduce or eliminate performance bottlenecks.

20 Claims, 6 Drawing Sheets

DYNAMIC ORDERING OF MEMORY DIE PROGRAMMING IN A METABLOCK

BACKGROUND

A non-volatile storage device typically includes multiple memory dies. In some examples, the memory dies may be grouped together for increased performance. For example, a memory die includes a number of different memory blocks and a memory block from each memory die may be grouped to form a metablock. Each memory block in a metablock may be accessed in parallel to optimize performance of the non-volatile storage device.

In a metablock, the order in which the memory dies are programmed is fixed. For example, if a metablock includes blocks from four different memory dies (e.g., memory die 0, memory die 1, memory die 2 and memory die 3), memory die 0 is programmed first, followed by memory die 1, memory die 2 and memory die 3. However, one (or more) of the memory dies associated with the metablock may perform slower than the other memory dies associated with the metablock. This may be due to the storage architecture utilized by the non-volatile storage device or due to physical characteristics of the memory die. The slower memory die may cause bottlenecks and reduce the overall performance of the non-volatile storage device. Accordingly, it would be beneficial to dynamically alter an order in which the various memory dies of a metablock can be programmed.

SUMMARY

The present application describes a system and method for dynamically changing a programming order of memory dies within a metablock of a non-volatile storage device. In some examples, the programming order of the memory dies may be based, at least in part, on a set of operations to be performed by the non-volatile storage device and/or on operating parameters associated with the memory dies. In an example, the operating parameters may include performance characteristics of the memory dies. In another example, the operating parameter may be a storage architecture utilized by the non-volatile storage device.

Accordingly, the present application describes a method that includes receiving a set of operations for a non-volatile storage device. In an example, the non-volatile storage device includes a first memory die and a second memory die. The first memory die and the second memory die are organized into a metablock and have a specified programming order for completing the set of operations. The method also includes identifying an operating parameter associated with at least one of the first memory die and the second memory die. The specified programming order of the first memory die and the second memory die within the metablock may then be altered based, at least in part, on the identified operating parameter of the at least one of the first memory die and the second memory die and on the set of operations. An updated programming order of the first memory die and the second memory die within the metablock is generated and stored.

The present application also describes a data storage device that includes a controller and a memory communicatively coupled to the controller. The memory stores instructions that, when executed by the controller, perform operations. The operations include identifying an operating parameter associated with at least one of a first memory die and a second memory die associated with the data storage device. In an example, the first memory die and the second memory die are organized into a metablock and have a specified programming order for completing a set of operations. The specified programming order of the first memory die and the second memory die within the metablock may be altered based, at least in part, on the identified operating parameter of the at least one of the first memory die and the second memory die and on the set of operations.

The application also describes a method that includes determining a performance characteristic of at least one of a first memory die and a second memory die in which the first memory die and the second memory die are organized into a metablock. In an example, the first memory die and the second memory die have a specified programming order for completing a set of operations. The specified programming order of the first memory die and the second memory die within the metablock is altered based, at least in part, on the determined performance characteristic of the at least one of the first memory die and the second memory die.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Various non-volatile storage devices utilize different types of storage architectures. For example, many cost-conscious controllers have a reduced amount of RAM and/or processing power in order to save costs. In some examples, firmware schemes of these storage architectures are driven by the availability of resources. For example, write operations may be performed on various memory dies only when the various memory dies are available.

Most storage architectures utilize a logical grouping of memory dies called a metablock. A metablock is typically comprised of one block from each memory die that has been logically grouped together. Further, each metablock may be associated with one or more sub-units called a metapage. A metapage includes a page from each memory die of the metablock. When a metablock is programmed, typically a first page from the first memory die of the metablock is programmed, a first page from the second memory die of the metablock is programmed and so on. In some examples, the programming of the pages may be done in parallel in order to increase performance.

Typically, the order in which the memory dies of a metablock are programmed is fixed. For example and as explained above, if a metablock includes blocks from four different memory dies (e.g., memory die 0, memory die 1, memory die 2 and memory die 3), a page from a block associated with memory die 0 is programmed first, followed by memory die 1, memory die 2 and memory die 3. While the programming may be done in parallel, only one operation may be performed on a particular memory die at a time. Thus, if two write operations were to be performed on the same memory die, the first write operation would need to be completed before the second write operation were to start. In some scenarios, this may cause a bottleneck which would reduce the performance of the non-volatile storage device.

In another example, one of the memory dies of the metablock may be slower than the other memory dies of the metablock. This may be due to physical characteristics (e.g., memory die variation) of the memory die and/or may be based on the number of program/erase (P/E) cycles performed by the memory die.

In order to address the above, the present application describes a system and method to dynamically change the programming order of the memory dies of a metablock. In an example, the programming order may be based on an operating parameter (e.g., a storage architecture, a performance characteristic) associated with the memory dies of the metablock and/or on the set of operations to be performed by the memory dies of the metablock.

For example, if a metablock included four memory dies, the specified programming order of the memory dies may memory die 0, memory die 1, memory die 2 and memory die 3. However, based on the operating parameters and/or the set of operations to be performed, the programming order of the memory die may be changed or altered such that memory die 2 is programmed first, followed by memory die 0, memory die 1 and memory die 3.

In an example, the programming order may be changed for all of the operations in the set of operations to be performed or a subset of operations in the set of operations. For example, the programming order of the memory dies may remain the same as the fixed order if multiple operations were to be performed on memory die 0 and memory die 1. However, the programming order of the memory dies may be altered if multiple operations were to be performed on memory die 2 or memory die 3.

Changing the programming order of the memory dies may increase performance of a non-volatile storage device and help reduce or eliminate performance bottlenecks. Although the examples shown and described herein are directed to specific storage architectures for non-volatile storage devices, the systems and methods described herein may be used in various types of non-volatile storage devices that implement various storage architectures. Additionally, although the examples described herein show and describe metablocks with four memory dies, the metablocks may have any number of memory dies.

Accordingly, the present application describes a number of technical benefits including increasing performance of non-volatile storage devices by reducing or eliminating processing bottlenecks by altering the programming order of memory dies within a metablock and maintaining or reducing production costs of the non-volatile storage devices by accomplishing the above without adding additional hardware.

These various benefits and examples will be described in greater detail below with reference to FIG. 1-FIG. 5.

Figure 1:
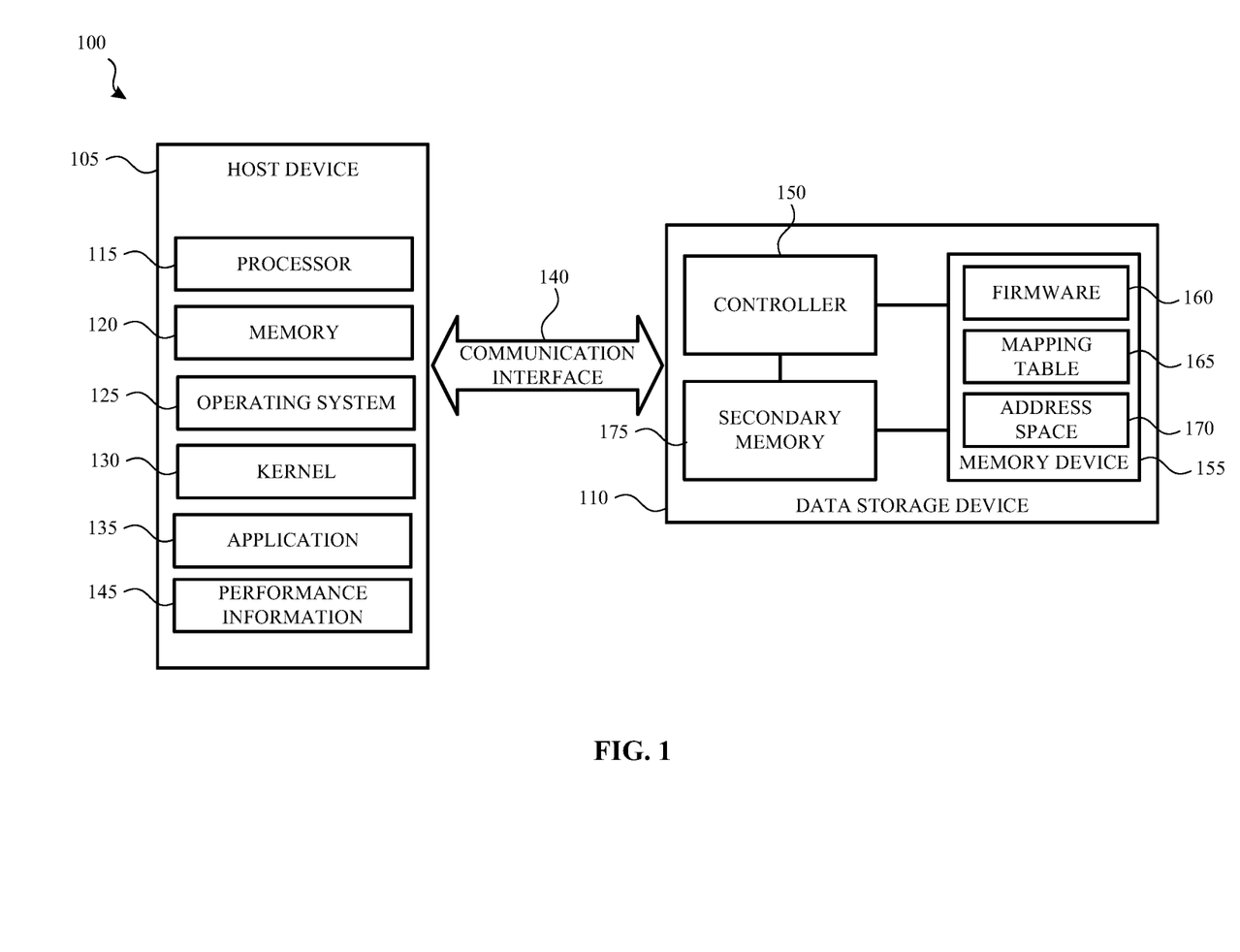
FIG. 1 is a block diagram of a system that may be used to execute the various processes described herein according to an example.

FIG. 1 is a block diagram of a system 100 that includes a host device 105 and a data storage device 110 according to an example. In an example, the host device 105 includes a processor 115 and a memory device 120 (e.g., main memory). The memory device 120 may include an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hardwired logic, analog circuitry and/or various combinations thereof. In an example, the processor 115 may include a System on a Chip (SoC).

In an example, the memory device 120 can be used by the host device 105 to store data used by the processor 115. Data stored in the memory device 120 may include instructions provided by the data storage device 110 via a communication interface 140. The data stored in the memory device 120 may also include data used to execute instructions from the operating system 125 and/or one or more applications 135. In an example, the memory 120 is volatile memory, such as, for example, Dynamic Random Access Memory (DRAM).

In an example, the operating system 125 may create a virtual address space for the application 135 and/or other processes executed by the processor 115. The virtual address space may map to locations in the memory device 120. The operating system 125 may include or otherwise be associated with a kernel 130. The kernel 130 may include instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or WiFi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

The data storage device 110 includes a controller 150 and a memory device 155 (e.g. volatile and/or non-volatile memory). The memory device 155 (and/or portions of the memory device 155) may also be referred to as a storage medium. The memory device 155 includes a number of storage elements. In an example, each storage element is a chip or a memory die that is used to store data.

For example, the memory device 155 may include a first memory die and a second memory die. In an example, the first memory die and the second memory die include non-volatile memory elements such as, for example, NAND flash memory elements and/or NOR flash memory elements. Although two memory dies are mentioned, the memory device 155 may include any number of storage elements. For example, the storage elements may take the form of solid-state memory such as, for example, 2D NAND, 3D NAND memory, multi-level cell memory, triple level cell memory, quad-level cell memory, penta-level cell memory or any combination thereof.

The controller 150 may include circuitry for executing instructions. The instructions may originate from firmware 160 associated with the data storage device 110. In another example, the instructions may originate from the host device 105. Accordingly, the controller 150 may include circuitry such as one or more processors, a microcontroller, a DSP, an ASIC, an FPGA, hard-wired logic, analog circuitry and/or a combination thereof. In another example, the controller 150 may include a SoC.

The data storage device 110 may also include secondary memory 175. The secondary memory 175 may be a rotating magnetic disk or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, EEPROM, other discrete Non-Volatile Memory (NVM) chips, or any combination thereof.

In some examples, the memory device 155 is capable of storing data at a byte-addressable level, as opposed to other types of non-volatile memory that have a smallest writable data size such as a page size of 4 KB or a sector size of 512 Bytes.

In some examples, the memory device 155 may also store a mapping table 165 and/or an address space 170. In some examples, the controller 150 can associate portions of data stored in the secondary memory 175 with unique identifiers. The unique identifiers may be stored in the memory device 155 and be used by the operating system 125 to access stored data. For example, the mapping table 165 can provide a mapping of unique identifiers with indications of physical locations (e.g., Physical Block Addresses (PBAs)) where the corresponding portions of data are stored in the memory device 155 and/or the secondary memory 175.

In some examples, the firmware 160 may store, maintain, be associated with or otherwise have access to a mapping table (e.g., mapping table 165) that stores and/or maintains the updated programming order of memory dies for specific metablocks such as will be described herein.

As briefly discussed above, the memory device 155 may also include address space 170. The address space 170 can serve as at least a portion of an address space used by the processor 115. In an example, the address space 170 can store data at a byte-addressable level that can be accessed by the processor 115 (e.g., via the communication interface 140).

For example, the data storage device 110 may provide the host device 105 with an indication of the address space 170. The host device 105 may then associate an address range for the address space 170 and an indication that this address range is to be used as a byte-addressable address space, such as for a page cache.

In another example, the host device 105 may manage the data storage device 110 such that the processor 115 can directly access address space 170. For example, the data storage device 110 may provide logical to physical address translation information to the host device 105, which can be called by the host device 105 and executed by the processor 115 and/or the controller 150. In some examples, the controller 150 may include or otherwise be associated with a flash translation layer (FTL). The FTL may map the logical block addresses to the physical addresses of the memory device 155.

Although FIG. 1 illustrates the host device 105 being separate from the data storage device 110, the host device 105 and the data storage device 110, as well the various components described, may be part of a single device or part of multiple devices.

Figure 2A:
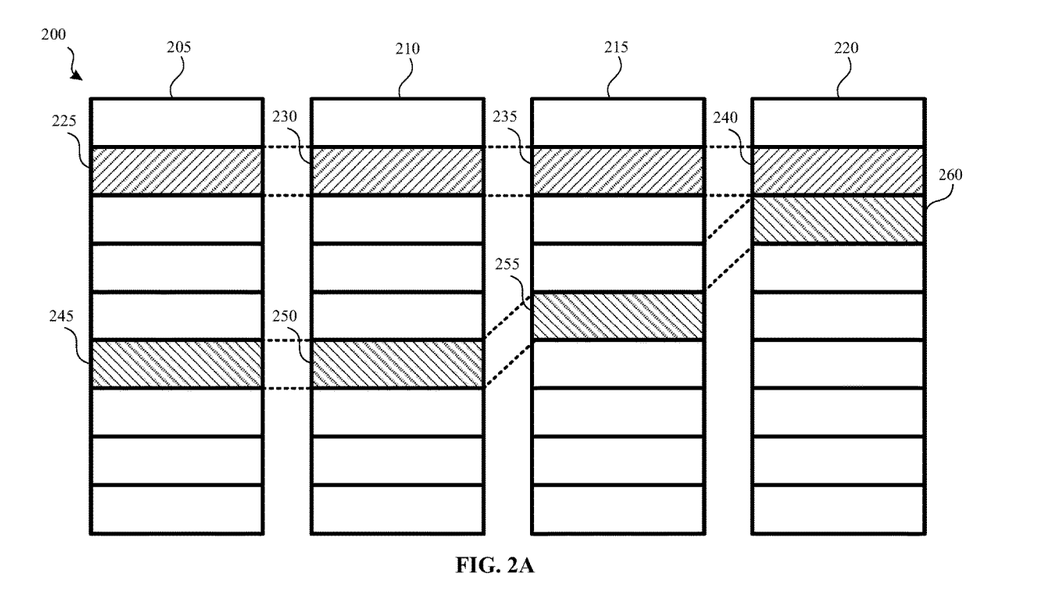
FIG. 2A illustrates how various blocks of a memory die may be organized into metablocks according to an example.

FIG. 2A illustrates organization of physical memory of a memory device 200. The memory device 200 may be similar to the memory device 155 shown and described with respect to FIG. 1.

In an example, the memory device 200 may be arranged in blocks of memory cells. A block of memory cells is the unit of erase (e.g., the smallest number of memory cells that are physically erasable together). For increased parallelism, however, each of the blocks may be operated or organized in larger metablocks. For example, one block from each of at least two planes of memory cells may be logically linked together to form a metablock.

As shown in FIG. 2A, the memory device 200 may include four planes or sub-arrays (e.g., sub-array 205, sub-array 210, sub-array 215, and sub-array 220) integrated on a single memory die. In another example, the planes or sub-arrays may be provided on two different memory dies (e.g., two planes on each memory die) or on four separate memory dies. Although four planes are shown and described, the memory device 200 may have any number of planes and/or memory dies.

In an example, the planes are individually divided into blocks of memory cells shown in FIG. 2A by rectangles, such as block 225, block 230, block 235 and block 240. There may be dozens or hundreds of blocks in each plane of the memory device 200. Blocks may be logically linked or grouped together (e.g., using a table in or otherwise accessible by the controller 150) to form a metablock that may be written to, read from and/or erased as a single unit. For example, block 225, block 230, block 235 and block 240 may form a first metablock while block 245, block 250, block 255 and block 260 form a second metablock. The blocks used to form a metablock need not be restricted to the same relative locations within their respective planes.

Figure 2B:
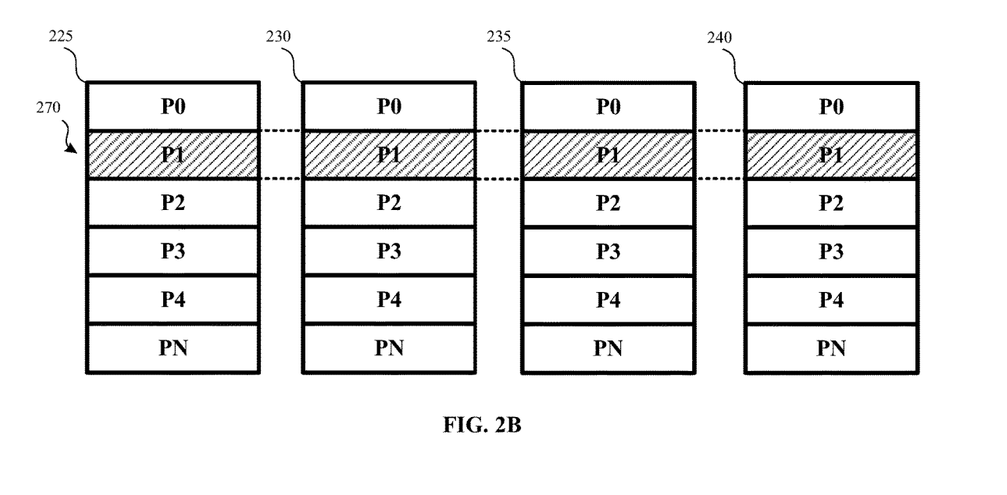
FIG. 2B illustrates how a metablock may include one or more metapages, in which a metapage includes a page from each of a plurality of memory dies according to an example.

In an example, each block may be divided for operational purposes into pages of memory cells, such as illustrated in FIG. 2B. The memory cells of each of block 225, block 230, block 235 and block 240 for example, are each divided into N different pages (shown as P0-PN). In an example, there may be 16, 32, or more pages of memory cells within each block.

In an example, a page is a unit of data programming within a block, containing the minimum amount of data that can be programmed at one time. The minimum unit of data that can be read at one time may be less than a page. A metapage 270 is illustrated in FIG. 2B as being formed of one physical page from each of block 225, block 230, block 235 and block 240. In the example, shown, the metapage 270 includes page P1 in each of the four blocks. However, the pages of the metapage 270 need not necessarily have the same relative position within each of the blocks. A metapage 270 may be the maximum unit of programming within a block.

The blocks disclosed in FIG. 2A-FIG. 2B are referred to herein as physical blocks because they relate to groups of physical memory cells as discussed above. As used herein, a logical block is a virtual unit of address space defined to have the same size as a physical block. Each logical block includes a range of logical block addresses (LBAs) that are associated with data received from a host. The LBAs are then mapped to one or more physical blocks in the data storage device 110 where the data is physically stored.

Figure 3A:
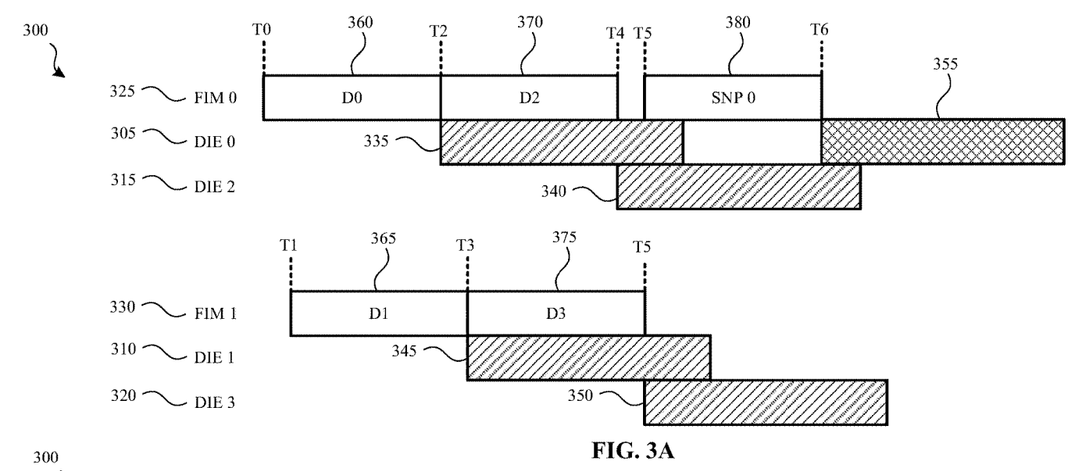
FIG. 3A-FIG. 3B illustrates an example storage architecture that may be implemented by a non-volatile storage device according to an example.

FIG. 3A illustrates an example storage architecture scheme for writing data to a metablock 300 according to an example. In the example shown in FIG. 3A, the metablock 300 includes four memory dies labeled Die 0 305, Die 1 310, Die 2 315 and Die 3 320. The metablock 300 is also associated with two, independent, flash interface modules (FIMs) labeled FIM 0 325 and FIM 1 330. In an example, each FIM may be a direct memory access channel (DMA) that enables data to be written, in parallel, to various pages of the memory dies of the metablock 300. For example, FIM 0 325 is associated with Die 0 305 and Die 2 315 while FIM 1 330 is associated with Die 1 310 and Die 3 320. Although FIG. 3A illustrates four memory dies and two FIMs, a metablock 300 and/or a storage architecture may include any number memory dies, metablocks and FIMs.

In the example shown in FIG. 3A, the storage architecture causes the memory dies to store two different types of data in a particular manner. For example, the memory dies may store host data (e.g., computer data, user data), represented by blocks D0 360, D1 365, D2 370 and D3 375, and internal or system level data (e.g., logical to physical mappings, parity data) referred to herein as snapshot data, and represented by SNP 0 380 (and SNP 3 390 (FIG. 3B)).

In this specific example, the storage architecture uses a snapshot XOR scheme. In this scheme, a set of operations (e.g., write operations may be performed by each of the memory dies. For example, once host data is written to a metapage of each of the memory dies, the metapages are XOR'ed together to create a parity page or snapshot page. The parity page may then be written to a block (referred to as a snapshot block) of one of the memory dies.

In an example, each memory die may include a snapshot block. When a snapshot page is generated, it is written to a snapshot block of each of the memory dies in a fixed order. For example, when a first snapshot page is generated (e.g., by XOR'ing the metapages together for a first time), the first snapshot page is stored in a snapshot block of Die 0 305. When a second snapshot page is generated, the second snapshot page is stored in a snapshot block of Die 1 310. This continues for Die 2 315 and Die 3 320. The process then repeats such that the fifth snapshot page is stored in the snapshot block of Die 0 305.

As discussed above, a set of operations, such as those just described, may be performed on the memory dies of a metapage. These operations will be described in greater detail with respect to FIG. 3A and FIG. 3B.

As shown in FIG. 3A, at time T0, host data (represented as data D0 360) is going to be written to Die 0 305. As such, D0 360 is transferred to Die 0 305 via FIM 0 325. Likewise, at time T1, host data (represented as data D1 365) that is going to be written to Die 1 310, is transferred to Die 1 310 via FIM 1 330. As shown, the data transfer operations and subsequent write or program operations (represented by block 335, block 340, block 345, block 350 and block 355) associated with each FIM, may be performed in parallel. Additionally, each write or program operation represented by block 335, block 340, block 345, block 350 and block 355 takes a particular amount of time (represented by the length of each block).

At time T2, data D0 360 has been completely transferred to Die 0 305. As such, data D0 360 is written to a metapage of Die 0 305. This operation is represented by block 335. Additionally, at time T2, data D2 370 that is going to be written to Die 2 315 is transferred to Die 2 315 via FIM 0 325.

Likewise, at time T3, data D1 365 has been completely transferred to Die 1 310. As such, data D1 365 can be written to a metapage of Die 1 310, which is represented by block 345. Additionally, at time T3, data D3 375 that is going to be written to Die 3 320 is transferred to Die 3 320 via FIM 1 330.

At time T4, data D2 370 has been completely transferred to Die 2 315. As such, data D2 370 is written to a metapage of Die 2 315, which is represented by block 340. Likewise, at time T5, data D3 375 has been completely transferred to Die 3 320. As such, data D3 375 is written to a metapage of Die 3 320, which is represented by block 350.

As also shown in FIG. 3A, at time T5, all of the data to be written to the various pages of the memory dies has been completely transferred to their respective memory dies. Accordingly, at time T5, data D0 360, data D1 365, data D2 370 and data D3 375 are XOR'ed together to generate parity information or the snapshot data described above (represented as SNP 0 380).

In this example, since the programming order of the memory dies in the metablock 300 is fixed, the parity information SNP 0 380 will be stored in a snapshot block associated with Die 0 305. As such, parity information SNP 0 380 is transferred to Die 0 305 via FIM 0 325. At time T6, the parity information SNP 0 380 is written to Die 0 305 (represented by block 355).

This process may repeat any number of times as long as there is host data to be written to the metablock 300. However, each time four metapages are written (e.g., each time a metapage on each of the memory dies is written to or otherwise programmed), parity information is generated. Additionally, the parity information is written to a snapshot block on each of the four different dies. For example, the next time parity information is generated, the parity information is written to Die 1 310, then to Die 2 315, then to Die 3 320. The process then repeats such as described above.

Figure 3B:
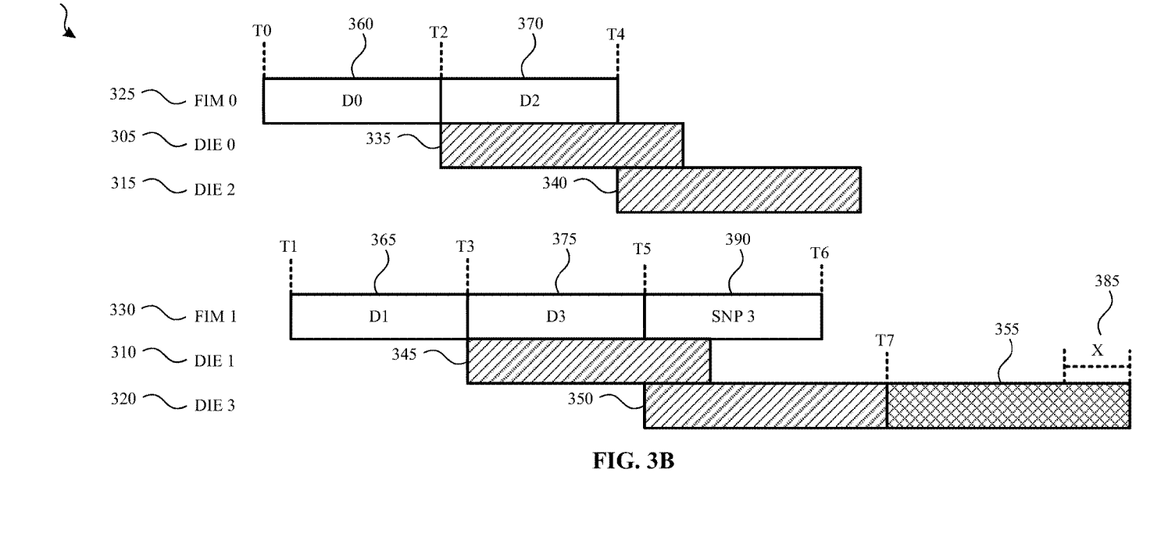

FIG. 3B illustrates an example of when the parity information is written to Die 3 320. As will be explained, due to the storage architecture, writing the parity data to Die 3 320 will cause a performance bottleneck and increase the amount of time (represented by the timeline X 385) it takes to complete the set of operations (when compared to the set of operations shown and described with respect to FIG. 3A).

For example and as shown in FIG. 3B, at time T0, data D0 360 that is going to be written to Die 0 305, is transferred to Die 0 305 via FIM 0 325. Likewise, at time T1, data D1 365 that is to be written to Die 1 310, is transferred to Die 1 310 via FIM 1 330.

At time T2, data D0 360 has been completely transferred to Die 0 305. As such, data D0 360 is written to a metapage of Die 0 305 (represented as block 335). Additionally, at time T2, data D2 370 that is going to be written to Die 2 315 is transferred to Die 2 315 via FIM 0 325.

Likewise, at time T3, data D1 365 has been completely transferred to Die 1 310. As such, data D1 365 is written to a metapage of Die 1 310 (represented as block 345). Additionally, at time T3, data D3 375 that is going to be written to Die 3 320 is transferred to Die 3 320 via FIM 1 330.

At time T4, data D2 370 has been completely transferred to Die 2 315. As such, data D2 370 is written to a metapage of Die 2 315 (represented as block 340). At time T5, data D3 375 has been completely transferred to Die 3 320. As such, data D3 375 is written to a metapage of Die 3 320 (represented as block 350).

As also shown in FIG. 3B, at time T5, data D0 360, data D1 365, data D2 370 and data D3 375 may be XOR'ed together to generate parity information (represented as SNP 3 390). In this example, parity information SNP 3 390 will be stored in a metapage associated with Die 3 320. As such, parity information SNP 3 390 is transferred to Die 3 320 via FIM 1 330. This transfer occurs at time T5 and the parity information is written to Die 3 320 at time T6 (e.g., once SNP 3 390 has been completely transferred to Die 3 320 via FIM 1 330).

However, as shown in FIG. 3B, at time T6, data D3 350 is still being written to Die 3 320. As such, SNP 3 390 cannot be written to Die 3 320 (at least until the previous write operation has been completed (e.g., at time T7)). Once data D3 375 has been written to Die 3 320, the parity information SNP 3 390 (represented as block 355) may be written to Die D3 320.

Although the set of operations performed in FIG. 3B are similar to the set of operations performed in 3A, it takes longer to perform the set of operations shown in FIG. 3B when compared with the set of operations shown and described with respect to FIG. 3A (represented by the timeline X 385). In one example, this may be due to the design of the storage architecture. In another example, this may be due to one or more performance characteristics (e.g., one memory die may be physically slower than another memory die) of a particular memory die (e.g., Die 3 320).

In order to address the above, the present application describes a process whereby the specified programming order of the memory dies within a metablock is altered or changed. In an example, the programming order of the memory dies may be changed based on a set of operations to be performed (e.g., which memory dies are tasked to write data) and/or on operating parameters (e.g., a storage architecture and/or performance characteristics) associated with the memory dies and/or a metablock of a non-volatile storage device.

In an example, when the specified programming order of the memory dies within a metablock has been changed and an updated programming order is generated, the updated programming order may be maintained by firmware (e.g., firmware 160 (FIG. 1)) and/or stored in a mapping table (e.g., mapping table 165 (FIG. 1)). Thus, any changes to the programming order of the memory dies within a metablock may be invisible to a FTL or GAT (group address table) of the non-volatile storage device and would not require any additional hardware.

In some examples, the determination that the programming order should be updated or changed may be determined at the time the non-volatile storage device is manufactured. For example, the programming order may be changed based on, for example, a prediction (or test cases) that the storage architecture being used by the non-volatile storage device may or will cause performance bottlenecks.

In another example, the programming order of the memory dies may be updated or changed dynamically in real-time or substantially real-time. For example, one or more performance characteristics of the memory dies of the non-volatile storage device may be periodically monitored (e.g., upon completion of a predetermined or threshold number of P/E cycles, after a threshold amount of time has passed).

Figure 3C:
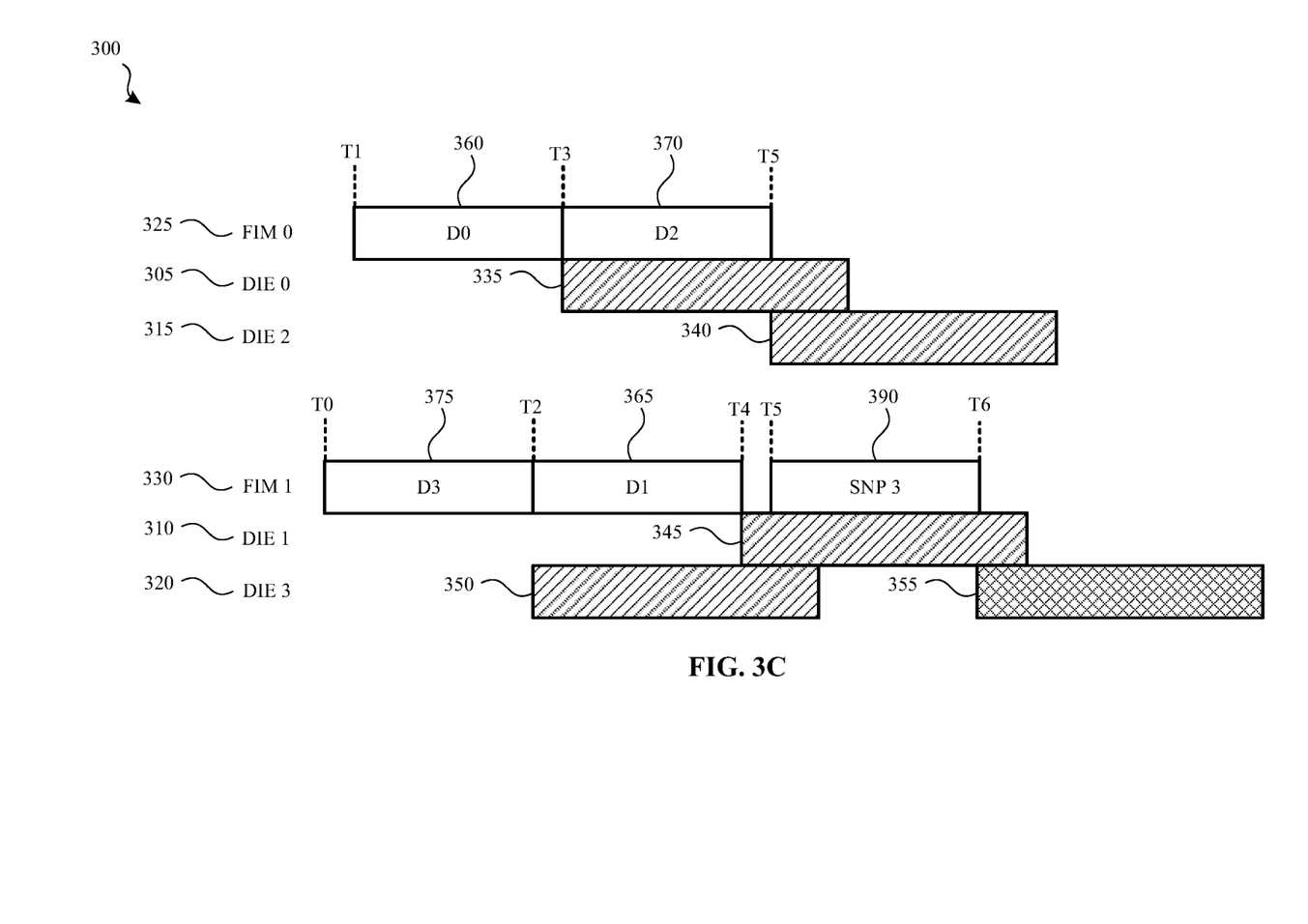
FIG. 3C illustrates how dynamically altering a programming order of memory dies within a metablock addresses performance issues for the storage architecture shown in FIG. 3A-FIG. 3B according to an example.

In the example shown and described with respect to FIG. 3C, the same programming operations that were described with respect to FIG. 3B will be used to demonstrate how changing the specified programming order of the various memory dies of a metablock 300 can reduce or eliminate performance bottlenecks and improve the overall performance of the non-volatile storage device.

In an example, firmware and/or a controller of the non-volatile storage device may determine that some (or all) operations, of a set of requested operations, cause various memory dies to have an increased workload. In some programming scenarios, the increased workload causes a bottleneck. For example, and as shown in FIG. 3C, Die 3 320 has an increased workload (e.g., due to writing data D3 375 and the parity information SNP 3 390). As explained above with respect to FIG. 3B, additional data cannot be written to the metablock 300 until all of the operations in the set of operations have been completed. As such, a performance bottleneck is occurring. In order to address this, the firmware may alter the programming order of the memory dies within the metablock 300 such that Die 3 320 begins its operations before the other memory dies when multiple operations are to be performed on or by Die 3 320.

For example and as shown in FIG. 3C, the firmware causes Die 3 320 to begin its operations before any of the other memory dies. Thus, at time T0, the firmware causes data D3 375 to be transferred to Die 3 320 via FIM 1 330. At time T1, data D0 360 is provided to Die 0 305 via FIM 0 325. At time T2, data D3 375 has been completely transferred to Die 3 320. As such, data D3 375 may be written to a metapage of Die 3 320 (represented as block 350). Additionally, at time T2, data D1 365 is transferred to Die 1 310 via FIM 1 330.

At time T3, data D0 360 is written to a metapage of Die 0 305 (represented as block 335) and data D2 370 may be transferred to Die 2 315 via FIM 0 325. At time T4, data D1 365 is written to a metapage of Die 1 310 (represented as block 345). At time T5, data D2 370 has been transferred to Die 2 315 and data D2 370 may be written to a metapage of die 2 315.

Additionally, at time T5, parity information SNP 3 390 is generated and provided to Die 3 320 via FIM 1 330. At time T6, the parity information SNP 3 390 is completely transferred to Die 3 320. As such, at time T6, and because the nothing is currently being written to Die 3 320, the parity information SNP 3 390 is written to a metapage in a snapshot block associated with Die 3 320 (represented by block 355).

Although the example shown in FIG. 3C is specific to Die 3 320, any memory die associated with the metablock 300 may be ordered first. For example, in the storage architecture shown and described with respect to FIG. 3A-FIG. 3B, if parity information were to be written to Die 2 315, the same delay (e.g., the delay shown in FIG. 3B) may be present in that implementation. Accordingly, when parity information is written to a metapage of Die 2 315, Die 2 315 may be ordered before Die 0.

This is further explained by the following example of a four memory die system. In this example, certain memory dies may have additional workloads while programming various metapages (such as described above). By reordering the programming order for certain memory dies, the system may work faster when compared to systems in which the programming order of memory dies isn't altered.

For example, if Die 0 has extra work, reordering the programming order of memory dies would not reduce the overall amount of time to perform the operations. Thus, on a metapage level (e.g., metapage 0), the programming order would remain Die 0, Die 1, Die 2, Die 3. Likewise, if Die 1 has extra work, the programming order for metapage 1 would be Die 0, Die 1, Die 2, Die 3.

However, if Die 2 has extra work, reordering the programming order of the dies would reduce the overall time when compared to systems in which the programming order of dies isn't altered. In this example, the programming order for metapage 2 would be Die 2, Die 0, Die 1, Die 3. Likewise, if Die 3 has extra work, the programming order of the dies would be as follows: Die 3, Die 0, Die 1, Die 2.

Figure 4A:
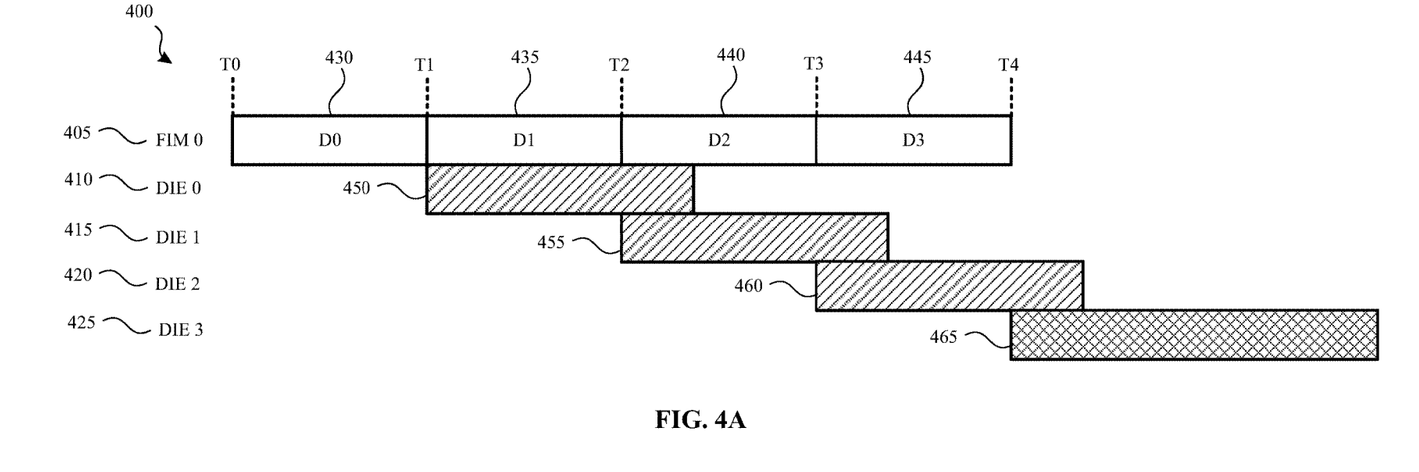
FIG. 4A illustrates another storage architecture that may be implemented by a non-volatile storage device according to an example.

FIG. 4A illustrates another example storage architecture that may be implemented by a non-volatile storage device. In the example shown in FIG. 4A, each metapage 400 may be programmed in a blocking order. For example and as shown in FIG. 4A, the non-volatile storage device may have a storage architecture in which a metablock 400 is associated with a single FIM, FIM 0 405. In this example, data D0 430 that is going to be written to a metapage of Die 0 410 is provided to Die 0 410 at time T0. At time T1 (when data D0 430 has been transferred to Die 0 410), data D0 430 (represented by block 450) is written to a metapage of Die 0 410. Likewise, at time T1, data D1 435 is provided, via FIM 0 405, to Die 1 415. At time T2, data D1 435 is written to a metapage of Die 1 415 (represented by block 455).

This process continues for data D2 440 and Data D3 445. For example, at time T2, data D2 440 is provided to Die 420 via FIM 0. At time T3, data D2 440 is written to a metapage of Die 2 420 (represented by block 460) and data D3 445 is provided to Die 3 425 via FIM 0 405. At time T4, data D3 445 is written to a metapage of Die 3 425 (represented by block 465).

In the example shown, Die 3 425 is slower (e.g., due to physical memory die variation when compared with the other memory dies) than the other memory dies associated with the metablock 400. This is represented by block 465 being longer when compared with the other blocks. In order to account for this scenario, the firmware associated with the non-volatile storage device may change the specified programming order of the memory dies such as described herein.

Figure 4B:
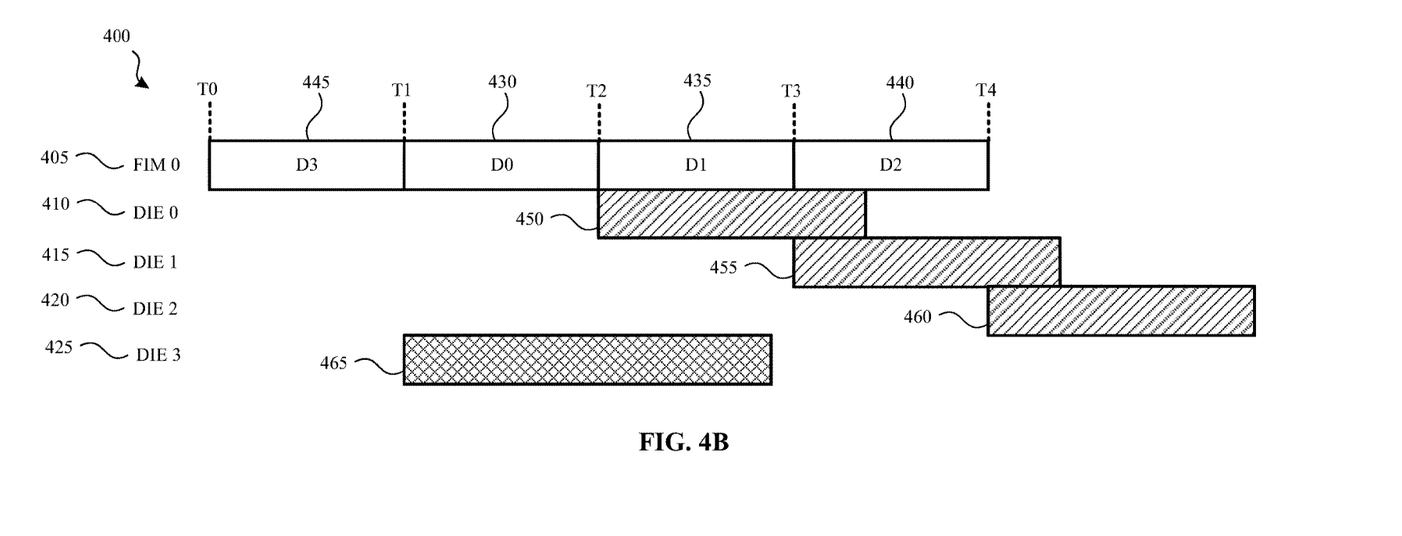
FIG. 4B illustrates how dynamically altering a programming order of memory dies within a metablock addresses performance issues for the storage architecture shown in FIG. 4A according to an example.

For example and as shown in FIG. 4B, the firmware of the non-volatile storage device, in combination with the controller of the non-volatile storage device, may alter the programming order of the memory dies. In this example, at time T0, data D3 445 is transferred to Die 3 425 via FIM 405. At time T1, data D3 445 is written to die 3 425. The remaining data may be provided to the various memory dies in the order shown in FIG. 4B. Namely, at time T1, data D0 430 is provided to Die 0 410; at time T2, data D1 435 is provided to Die 1 415; and at time T3, data D2 is provided to Die 2 425. The data is then written to the respective memory dies at times T2, T3 and T4 respectively.

Dynamically altering the programming order of the memory dies such as described increases performance of various storage architectures. Although specific storage architectures are shown and described, it is contemplated that the operations described herein may be used with any number of storage architectures in which one or more memory dies are slower (e.g., due to the workload of the memory die and/or performance characteristics) than other memory dies of a non-volatile storage device.

Figure 5:
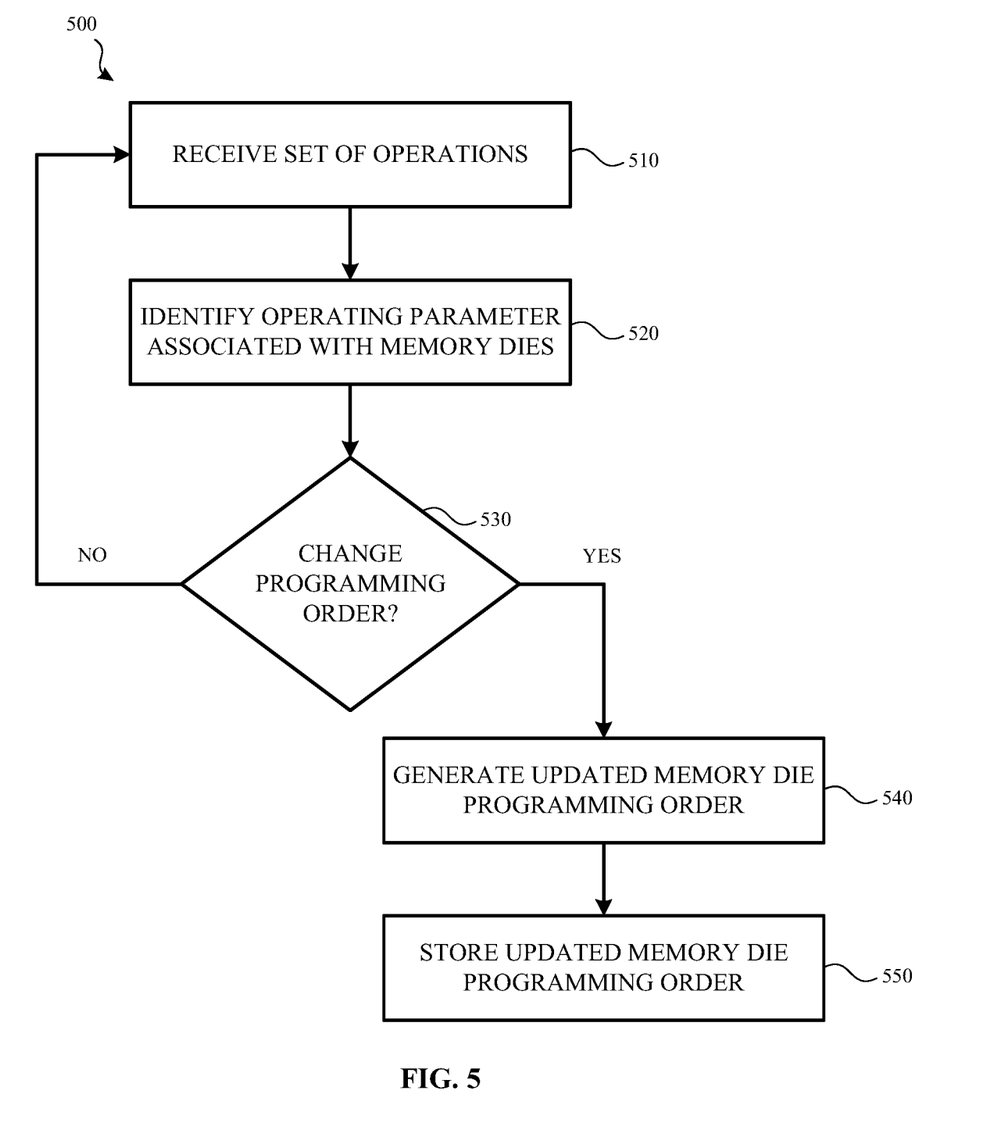
FIG. 5 illustrates a method for dynamically altering a programming order of memory dies within a metablock according to an example.

FIG. 5 illustrates a method 500 for dynamically altering a programming order of memory dies within a metablock according to an example. In an example, the method 500 may be performed by a host device and/or a data storage device such as, for example, the host device 105 and/or the data storage device 110 shown and described with respect to FIG. 1.

In some examples, the method 500, or various portions of the method 500, may be performed during a manufacturing process of the data storage device. For example, although the programming order of the memory dies within a metablock is typically fixed (e.g., in a scenario in which a metablock includes four memory dies, memory die 0 is programmed first, followed by memory die 1, memory die 2 and memory die 3), various storage architectures may inherently cause performance delays. As such, the programming order of the various memory dies may be altered during the manufacturing process.

In another example, the data storage device may periodically determine performance characteristics of one or more of its memory dies. For example, a data storage device may, after a threshold amount of time (or after a threshold amount of P/E cycles), measure a speed at which various memory dies complete one or more operations of a set of operations. Depending on the monitored speed, the data storage device may dynamically alter the programming order of the various memory dies. In yet another example, the programming order of memory dies may be based, at least in part, on a set of operations that are to be performed by the various memory dies.

Method 500 begins when a set of operations is received (510) by, for example a controller. In an example, the set of operations is to be performed by at least a first memory die and a second memory die. In an example, the first memory die and the second memory die are organized into a metablock. Additionally, the programming order of each memory die is predetermined and/or fixed. For example, the first memory die may typically be programmed first, followed by the second memory die.

Operating parameters of at least one of the first memory die and the second memory die may then be determined (520). In an example, the operating parameters of the at least one of the first memory die and the second memory die may be associated with a storage architecture of the non-volatile storage device. For example and depending on the storage architecture, writing data to various metapages associated with the first memory die or the second memory die may require additional write operations (e.g., such as described above with respect to FIG. 3A).

In another example, the operating parameters of the at least one of the first memory die and the second memory die may be based, at least in part, on a performance characteristic of the memory dies. In an example, a performance characteristic may be a speed at which the memory die is able to complete one or more requested operations.

A determination (530) may then be made whether to change the programming order of the memory dies. As discussed above, the determination may be based, at least in part, on the set of operations and/or on the operating parameters of the first memory die and/or the second memory die.

If it is determined that the operating parameters do not need to be updated, flow may proceed back to operation 510 and the method 500 may be repeated. However, if it is determined 530 that the programming order of the memory dies should change, an updated memory die programming order is generated. In an example, the updated memory die programming order is based, at least in part, on the operating parameters of the first memory die and/or the second memory die and/or the set of operations to be performed. Thus, in some examples, the programming order of the memory dies may be altered for some operations in the set of operations and not for other operations of the set of operations.

When the updated memory die programming order has been generated, the updated programming order may be stored (550). In an example, the updated programming order may be stored by a mapping table associated with firmware of the non-volatile storage device.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device (e.g., host device 105 (FIG. 1)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In accordance with the above, the present application describes a method, comprising: receiving a set of operations for a non-volatile storage device comprising a first memory die and a second memory die, the first memory die and the second memory die being organized into a metablock and having a specified programming order for completing the set of operations; identifying an operating parameter associated with at least one of the first memory die and the second memory die; altering the specified programming order of the first memory die and the second memory die within the metablock based, at least in part, on the identified operating parameter of the at least one of the first memory die and the second memory die and on the set of operations to generate an updated programming order of the first memory die and the second memory die within the metablock; and storing the updated programming order. The present application also describes that the updated programming order is used for a subset of operations from the set of operations. The present application also describes that identifying the operating parameter associated with the at least one of the first memory die and the second memory die comprises determining a performance characteristic of at least one of the first memory die and the second memory die in response to a threshold number of program/erase cycles being performed by at least one of the first memory die and the second memory die. The present application also describes that the operating parameter is a performance characteristic of the at least one of the first memory die and the second memory die is identified during a manufacturing process of the at least one of the first memory die and the second memory die. The present application also describes that the set of operations comprises writing data to a metapage associated with the at least one of the first memory die and the second memory die. The present application also describes that the updated programming order is maintained by firmware. The present application also describes that the operating parameter is associated with a storage architecture utilized by the non-volatile storage device.

The present application also describes a data storage device, comprising: a controller; and a memory communicatively coupled to the controller and storing instructions that, when executed by the controller, perform operations, comprising: identifying an operating parameter associated with at least one of a first memory die and a second memory die associated with the data storage device, the first memory die and the second memory die being organized into a metablock and having a specified programming order for completing a set of operations; and altering the specified programming order of the first memory die and the second memory die within the metablock based, at least in part, on the identified operating parameter of the at least one of the first memory die and the second memory die and on the set of operations. The present application also describes that the data storage includes instructions for storing the altered specified programming order in a mapping table maintained by firmware associated with the data storage device. The present application also describes that the altered specified programming order is used for a subset of operations from the set of operations. The present application also describes that the operating parameter is a performance characteristic and wherein the instructions further comprise instructions for determining the performance characteristic of the at least one of the first memory die and the second memory die in response to a threshold number of program/erase cycles being performed by the at least one of the first memory die and the second memory die. The present application also describes that the operating parameter is a performance characteristic of the at least one of the first memory die and the second memory die and wherein the performance characteristic is identified during a manufacturing process of the at least one of the first memory die and the second memory die. The present application also describes that the set of operations comprises writing data to a metapage associated with the at least one of the first memory die and the second memory die. The present application also describes that the operating parameter is associated with a storage architecture of the data storage device. The present application also describes that set of operations comprises: storing host data on the first memory die and the second memory die; and storing system level data on at least one of the first memory die and the second memory die.

The present application also describes a method, comprising: determining a performance characteristic of at least one of a first memory die and a second memory die, the first memory die and the second memory die being organized into a metablock and having a specified programming order for completing a set of operations; and altering the specified programming order of the first memory die and the second memory die within the metablock based, at least in part, on the determined performance characteristic of the at least one of the first memory die and the second memory die. The method also includes altering the specified programming order of the first memory die and the second memory die within the metablock based, at least in part, on the determined performance characteristic of the at least one of the first memory die and the second memory die and on a set of operations to be performed by the at least one of the first memory die and the second memory die. In an example, the performance characteristic of the at least one of the first memory die and the second memory die is determined in response to a threshold number of program/erase cycles being performed by the at least one of the first memory die and the second memory die. In an example, the performance characteristic of the at least one of the first memory die and the second memory die is identified during a manufacturing process of the at least one of the first memory die and the second memory die. The method also includes storing the altered specified programming order in a mapping table.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Additionally, it is contemplated that the flowcharts and/or aspects of the flowcharts may be combined and/or performed in any order.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
receiving a set of operations for a non-volatile storage device comprising a first memory die and a second memory die, the first memory die and the second memory die being associated with a metablock and having a specified programming order for completing the set of operations;
identifying an operating parameter associated with at least one of the first memory die and the second memory die;
altering the specified programming order of the first memory die and the second memory die within the metablock based, at least in part, on the identified operating parameter of the at least one of the first memory die and the second memory die and on the set of operations to generate an updated programming order of the first memory die and the second memory die within the metablock, the updated programming order indicating the second memory die is programmed before the first memory die when at least one operation of the set of operations is executed;
storing the updated programming order; and
executing the at least one operation of the set of operations using the updated programming order.

2. The method of claim 1, wherein identifying the operating parameter associated with the at least one of the first memory die and the second memory die comprises determining a performance characteristic of at least one of the first memory die and the second memory die in response to a threshold number of program/erase cycles being performed on at least one of the first memory die and the second memory die.

3. The method of claim 1, wherein the operating parameter is a performance characteristic of the at least one of the first memory die and the second memory die and is identified during a manufacturing process of the at least one of the first memory die and the second memory die.

4. The method of claim 1, wherein the set of operations comprises writing data to a metapage associated with the at least one of the first memory die and the second memory die.

5. The method of claim 1, wherein the updated programming order is maintained by firmware.

6. The method of claim 1, wherein the operating parameter is associated with a storage architecture utilized by the non-volatile storage device.

7. A method, comprising:
   determining a performance characteristic of at least one of a first memory die and a second memory die, the first memory die and the second memory die being associated with a metablock and having a specified programming order for completing a set of operations;
   altering the specified programming order of the first memory die and the second memory die within the metablock based, at least in part, on the determined performance characteristic of the at least one of the first memory die and the second memory die; and
   executing one or more operations of the set of operations on the metablock using the altered specified programming order.

8. The method of claim 7, wherein the specified programming order of the first memory die and the second memory die within the metablock is altered based, at least in part, on the determined performance characteristic of the at least one of the first memory die and the second memory die and on a set of operations to be performed by the at least one of the first memory die and the second memory die.

9. The method of claim 7, wherein the performance characteristic of the at least one of the first memory die and the second memory die is determined in response to a threshold number of program/erase cycles being performed on the at least one of the first memory die and the second memory die.

10. The method of claim 7, wherein the performance characteristic of the at least one of the first memory die and the second memory die is identified during a manufacturing process of the at least one of the first memory die and the second memory die.

11. The method of claim 7, further comprising storing the altered specified programming order in a mapping table.

12. The method of claim 7, further comprising executing one or more different operations of the set of operations on the metablock using the specified programming order.

13. A data storage device, comprising:
   a controller operable to:
      identify an operating parameter associated with at least one of a first memory die and a second memory die associated with the data storage device, the first memory die and the second memory die being associated with a metablock and having a specified programming order for completing a set of operations;
      alter the specified programming order of the first memory die and the second memory die within the metablock based, at least in part, on the identified operating parameter of the at least one of the first memory die and the second memory die and on the set of operations; and
      execute one or more operations of the set of operations on the metablock using the altered specified programming order.

14. The data storage device of claim 13, wherein the controller is further operable to store the altered specified programming order in a mapping table maintained by firmware associated with the data storage device.

15. The data storage device of claim 13, wherein the operating parameter is a performance characteristic and wherein the controller is further operable to determine the performance characteristic of the at least one of the first memory die and the second memory die in response to a threshold number of program/erase cycles being performed on the at least one of the first memory die and the second memory die.

16. The data storage device of claim 13, wherein the operating parameter is a performance characteristic of the at least one of the first memory die and the second memory die and wherein the performance characteristic is identified during a manufacturing process of the at least one of the first memory die and the second memory die.

17. The data storage device of claim 13, wherein the set of operations comprises writing data to a metapage associated with the at least one of the first memory die and the second memory die.

18. The data storage device of claim 13, wherein the operating parameter is associated with a storage architecture of the data storage device.

19. The data storage device of claim 13, wherein the set of operations comprises:
   storing host data on the first memory die and the second memory die; and
   storing system level data on at least one of the first memory die and the second memory die.

20. The data storage device of claim 13, wherein the controller is further operable to execute one or more different operations of the set of operations on the metablock using the specified programming order.

* * * * *